(No Model.)
M. F. HABER.
SOLDERING TOOL.
No. 269,784.  Patented Dec. 26, 1882.
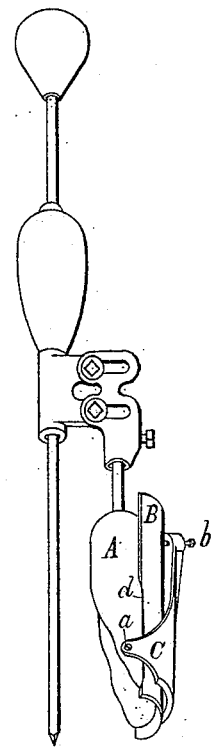
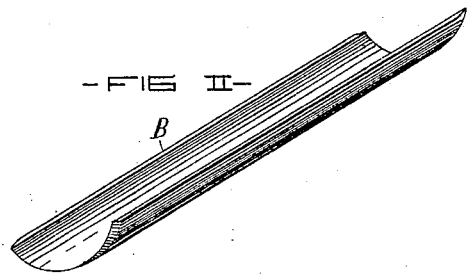
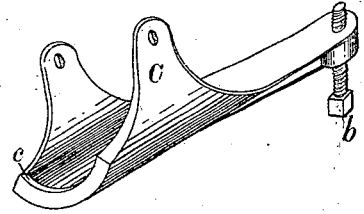
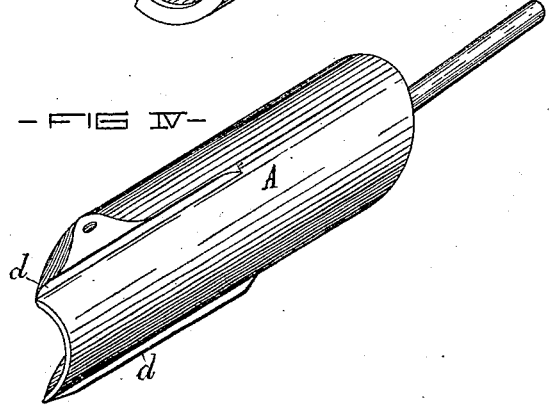
WITNESSES
Danl Fisher
Ed. J. Diggs
INVENTOR
Maximilian F. Haber
by G.H. & W.T. Howard
Attys

UNITED STATES PATENT OFFICE.

MAXIMILIAN F. HABER, OF BALTIMORE, MARYLAND, ASSIGNOR TO THE SCOTT MANUFACTURING COMPANY, OF SAME PLACE.

SOLDERING-TOOL.

SPECIFICATION forming part of Letters Patent No. 269,784, dated December 26, 1882.

Application filed September 12, 1882. (No model.)

*To all whom it may concern:*

Be it known that I, MAXIMILIAN F. HABER, of the city of Baltimore, and State of Maryland, have invented certain Improvements in Soldering-Tools, of which the following is a specification.

This invention relates to certain improvements in that description of soldering-tools which are used in the capping of cans, and which for that purpose have a curved soldering-edge adapted to fit the crease in which the joint between the cap and can-head is formed; and it consists in applying to a curved block of such size as will retain the necessary heat to melt the solder for a considerable length of time a curved plate, which furnishes the soldering edge or face, and a holder or clamp adapted to secure the said curved plate and admit of its primal adjustment, and its readjustment when worn, as will hereinafter fully appear.

In the further description of my invention which follows reference is made to the accompanying drawings, forming a part hereof, and in which—

Figure I is a perspective view of a soldering-tool embodying my invention. Figs. II, III, and IV are views in perspective, on an enlarged scale, of parts of the tool.

Similar letters of reference indicate similar parts in all the views.

A is the heat-retaining block of the soldering-tool, which is here shown provided with a handle and other necessary parts, after the manner of the leading capping-tools in use.

B is the adjustable curved soldering-plate, preferably of such thickness as will give, without being tapered at the end, the proper soldering-edge.

C is a clamping-plate hinged to the soldering-block A by means of pins or bolts $a\,a$, and provided with a set-screw, $b$, to be used in the clamping operation. The lower edge of the plate C has preferably a lip, $c$, which in the setting up of the screw $b$ is brought forcibly into contact with the outer side of the soldering-plate B.

By reference to Fig. I it will be seen that the soldering-plate is clamped at one end by the edge of the hinged plate C and at the other by the set-screw $b$. The heat-retaining block A has projections $d\,d$, which serve to prevent lateral movement of the soldering-plate B.

The operation of this class of soldering-tools is too well known to those versed in the art of capping cans to require any description herein.

When the soldering-plate, which is at first given the proper projection beyond the heat-retaining block, becomes worn, the clamp is loosened, the plate moved forward, and the screw $b$ again set up. By this means an effective capping-tool can be maintained without any forging or repairing until the soldering-plate is reduced by wear to a narrow strip, when another must be substituted therefor.

I claim as my invention—

1. In combination with the block A, the soldering-plate B, hinged clamp C, and set-screw $b$, substantially as specified.

2. The block A, having the projections $d$, combined with the clamp C and the soldering-plate B, substantially as specified.

MAXIMILIAN FREDRICK HABER.

Witnesses:
ED J. DIGGS,
JOHN WILLIAMS.